US009609171B2

(12) United States Patent
Sagimori

(10) Patent No.: US 9,609,171 B2
(45) Date of Patent: Mar. 28, 2017

(54) APPLYING LUMINANCE CONVERSION PROCESSING IN ACCORDANCE WITH IMAGE ATTRIBUTE INFORMATION TO IMPROVE EDGE DETECTION AND IMAGE DATA CORRECTION FOR PSEUDO HALFTONE PROCESSING

(71) Applicant: Yuuki Sagimori, Kanagawa (JP)

(72) Inventor: Yuuki Sagimori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/918,008

(22) Filed: Oct. 20, 2015

(65) Prior Publication Data

US 2016/0119502 A1 Apr. 28, 2016

(30) Foreign Application Priority Data

Oct. 23, 2014 (JP) ................................. 2014-216114

(51) Int. Cl.
*H04N 1/405* (2006.01)
*H04N 1/409* (2006.01)
*G06K 15/02* (2006.01)

(52) U.S. Cl.
CPC ....... *H04N 1/4092* (2013.01); *G06K 15/1871* (2013.01); *G06K 15/1881* (2013.01); *H04N 1/405* (2013.01)

(58) Field of Classification Search
None
See application file for complete search history.

(56) References Cited

U.S. PATENT DOCUMENTS

| 6,791,717 | B1 * | 9/2004 | Ariga | H04N 1/405 358/2.1 |
| 2008/0101717 | A1 * | 5/2008 | Ho | G06T 7/0085 382/266 |
| 2011/0273746 | A1 | 11/2011 | Hoshino et al. | |
| 2012/0287477 | A1 * | 11/2012 | Ozawa | H04N 1/405 358/3.13 |
| 2013/0021624 | A1 * | 1/2013 | Misaizu | H04N 1/4072 358/1.9 |

FOREIGN PATENT DOCUMENTS

| JP | 2006-295877 | 10/2006 |
| JP | 2009-065541 | 3/2009 |

* cited by examiner

*Primary Examiner* — Scott A Rogers
(74) *Attorney, Agent, or Firm* — Cooper & Dunham LLP

(57) ABSTRACT

An image processing device includes a first gradation processor to apply first pseudo halftone processing to image data, an edge detector to detect an edge portion of the image data to output a detection result, a correction value calculator to calculate an edge correction amount and convert the image data to corrected image data based on the edge correction amount, a second gradation processor to apply, to the corrected image data, second pseudo halftone processing for edge processing, and an output selector to adopt a processing result at the first gradation processor to a non-edge portion of the image data, and a processing result at the second gradation processor to an edge portion of the image data, based on the detection result at the edge detector.

10 Claims, 6 Drawing Sheets

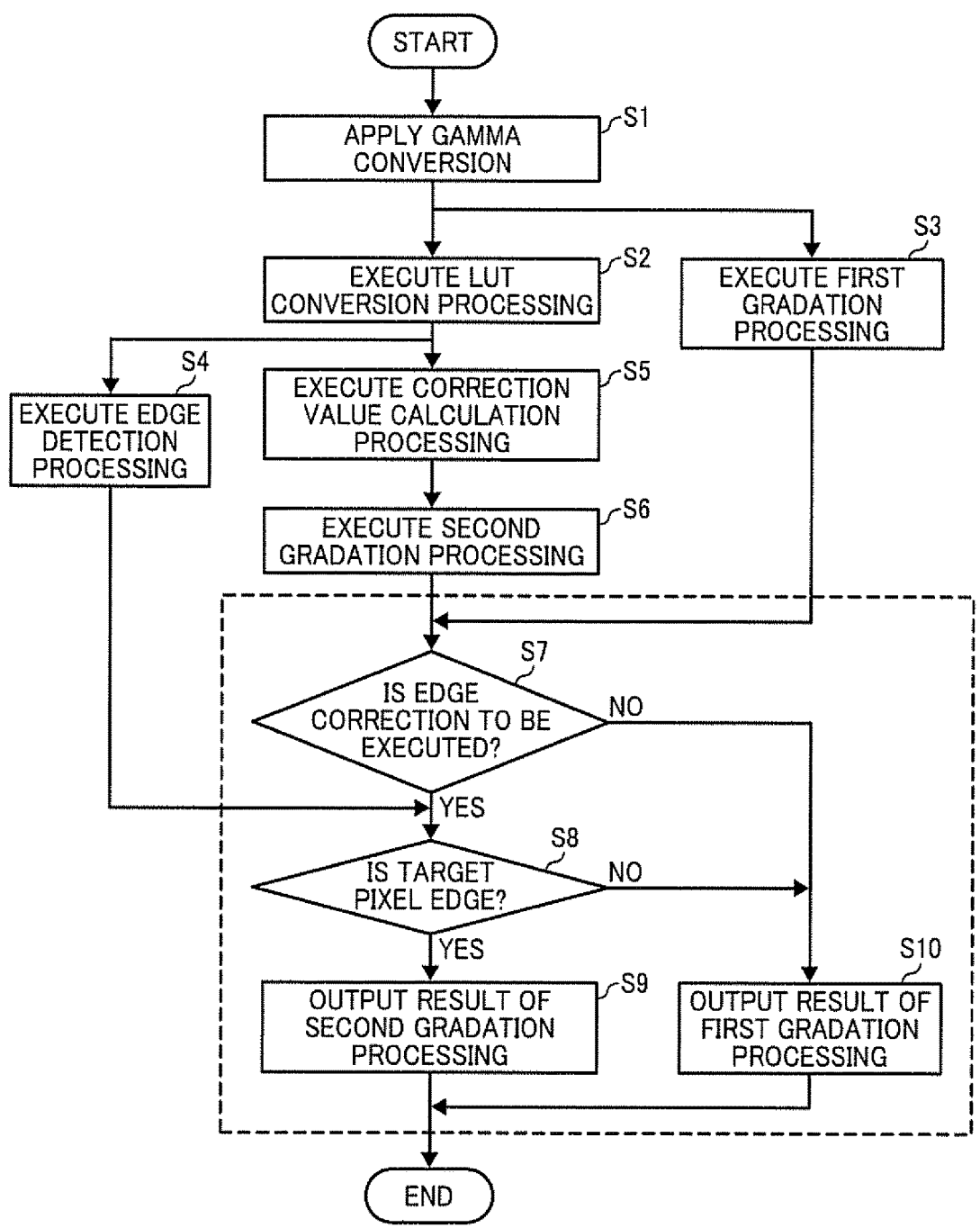

APPLYING LUMINANCE CONVERSION PROCESSING IN ACCORDANCE WITH IMAGE ATTRIBUTE INFORMATION TO IMPROVE EDGE DETECTION AND IMAGE DATA CORRECTION FOR PSEUDO HALFTONE PROCESSING

CROSS-REFERENCE TO RELATED APPLICATIONS

This patent application is based on and claims priority pursuant to 35 U.S.C. §119 to Japanese Patent Application No. 2014-216114, filed on Oct. 23, 2014, in the Japan Patent Office, the entire disclosure of which is hereby incorporated by reference herein.

BACKGROUND

Technical Field

The present invention relates to an image processing device, an image processing method, a recording medium storing an image processing program, and an image forming apparatus.

Background Art

It is known that jaggies (step-like jagged portions) are generated at an edge portion of an image when image data subjected to pseudo halftone processing in an image processor is output from an image forming device such as a printer. There is a proposed technology to improve such jaggies generated at the edge portion to improve image quality.

SUMMARY

Example embodiments of the present invention include an image processing device, which includes a first gradation processor to apply first pseudo halftone processing to image data, an edge detector to detect an edge portion of the image data to output a detection result, a correction value calculator to calculate an edge correction amount and convert the image data to corrected image data based on the edge correction amount, a second gradation processor to apply, to the corrected image data, second pseudo halftone processing for edge processing, and an output selector to adopt a processing result at the first gradation processor to a non-edge portion of the image data, and a processing result at the second gradation processor to an edge portion of the image data, based on the detection result at the edge detector.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is a flowchart illustrating processing executed by the image processor according to an embodiment of the present invention.

Figure 1:
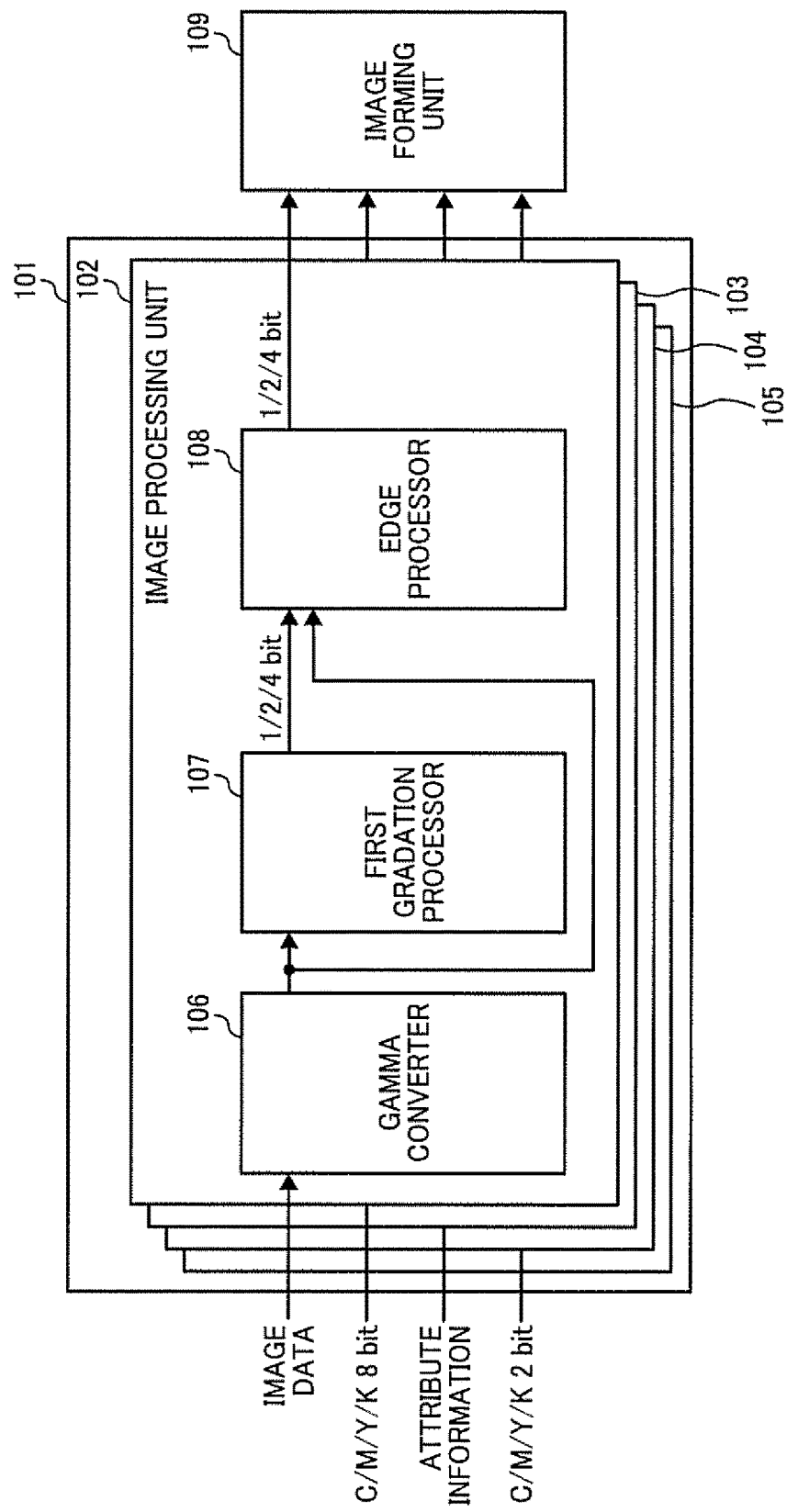
FIG. 1 is a block diagram illustrating a configuration of an image processor according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF THE INVENTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

According to one method of improving jaggies generated at an edge portion, second image data is obtained by applying pseudo halftone processing to first image data, and jaggies in the second image data are improved based on the first image data, the second image data, and attribute data indicating attribute of each of pixels included in the first image data, for example. More specifically, based on the attribute data, whether to apply smoothing processing is determined. When smoothing is performed, edge correction data is generated from the first image data. A pixel signal of the second image data is compared with a pixel signal of the generated edge correction data, thereby outputting a higher-density pixel signal.

According to the method of outputting the higher-density pixel signal by comparing the pixel signal of the edge correction data with that of the image data as described above, it is necessary to provide a component to compare the pixel signal of the second image data with the pixel signal of the edge correction data.

Further, in the case where there is unevenness in the pixel signal of the edge portion as a result of the selected high-density pixel signal, a phenomenon causing colors of a printed matter to appear darker than actual data due to collapse of halftone dots (dot gain) may occur at the time of outputting the image from an image forming device such as a printer, and there may be a problem in which jaggies at the edge portion are not sufficiently improved, lacking smoothness.

Considering this, demanded is an image processor capable of improving, with a simple configuration, jaggies at the edge portion without receiving any influence of the dot gain.

In the following, a configuration according to the present invention will be described in detail based on embodiments illustrated in FIGS. 1 to 7. The image processor (image processor 101) according to the present embodiment includes a first gradation processor (first gradation processor 107) to apply pseudo halftone processing to image data (first image data), an edge detector (edge detector 202 in FIG. 2) to detect an edge portion of the image data, a correction value calculator (correction value calculator 401) to calculate an edge correction amount and convert the image data to corrected image data based on the edge correction amount, and a second gradation processor (second gradation processor 402) to apply, to the corrected image data, pseudo halftone processing for edge processing. A processing result at the first gradation processor is adopted to a non-edge portion, and a processing result at the second gradation processor is adopted to the edge portion based on a detection result at the edge detector. Additionally, for image data received in the edge detector and the correction value calculator, provided is an LUT converter (LUT converter 201) to apply LUT conversion processing to the image data in accordance with attribute information of the image data, and output image data subjected to the LUT conversion processing (second image data) to the edge detector and the correction value calculator. Note that figures in the above parentheses indicate reference signs and examples of application.

FIG. 1 is a block diagram illustrating a configuration of an image processor 101 according to an embodiment of the present invention. An outline of the image processor 101 will be described with reference to FIG. 1. The image processor 101 according to the present embodiment includes a plurality of image processing units 102 to 105 corresponding to C, M, Y, and K, respectively. The image data subjected to color conversion (also referred to as first image data) and attribute information are received in the image processor 101 from a digital front end (DFE) server and the like. In this example, the image data includes image data of colors of C, M, Y, and K. The image data of C, M, Y, and K are respectively processed at image processing units 102 to 105, and output to an image forming unit 109. The image forming unit 109 outputs a formed image, and may be implemented by such as an ink jet printer or an electrophotographic printer. Further, the image processor 101 with the image forming unit 109 may form an image forming apparatus.

In the following, a description will be given by exemplifying the image processing unit 102. Note that the processing in the image processing units 102 to 105 applied to the respective colors is the same processing, but respective parameters may be set differently.

The image processing unit 102 includes a gamma converter 106, a first gradation processor 107, and an edge processor 108. First, the gamma converter 106 applies γ-correction (gamma conversion) to the 8-bit first image data received at the image processing unit 102 to correct gradation characteristics of the first image data.

The first gradation processor 107 applies first gradation processing (first pseudo halftone processing) to the first image data subjected to γ correction received from the gamma converter 106. In the first gradation processor 107, gradation processing to express gradations by pseudo halftone processing (dither processing, error diffusion processing, etc.) is applied.

The data subjected to the gradation processing at the first gradation processor 107 (also referred to as gradation-processed image data) is converted to, for example, 1/2/4-bit data in accordance with output gradation of the image forming unit 109, but not limited thereto.

In the edge processor 108, edge processing is executed based on the gradation-processed image data subjected to the gradation processing at the first gradation processor 107 and the first image data subjected to γ correction. Then, the image data subjected to the edge processing (also referred to as edge-processed image data) is transferred to the image forming unit 109.

Figure 2:
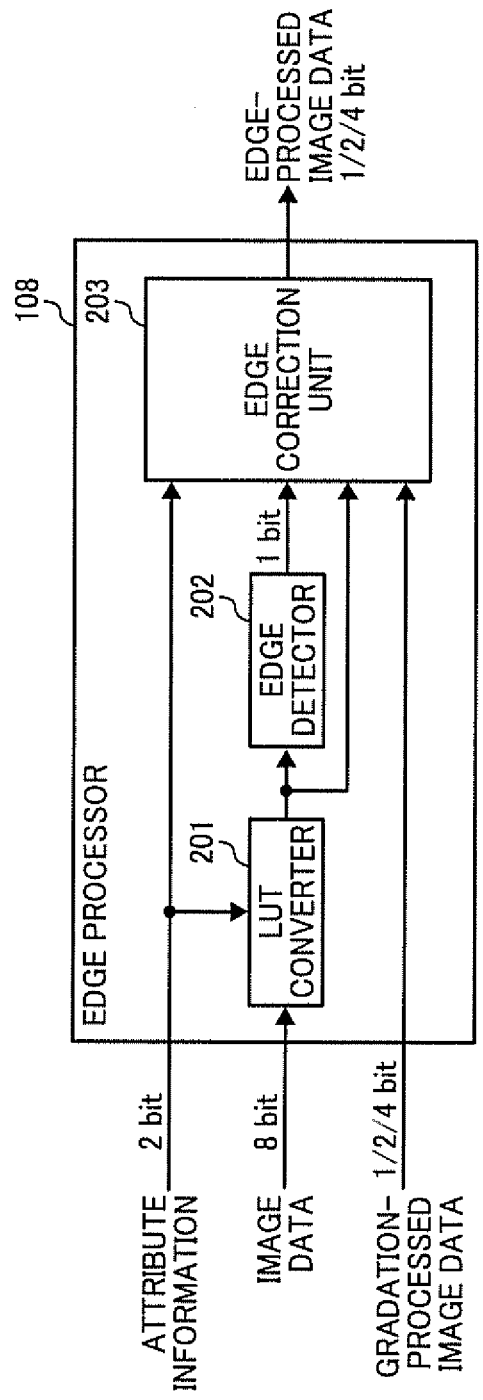
FIG. 2 is a block diagram illustrating a configuration of an edge processor according to the embodiment of the present invention.

FIG. 2 is a block diagram illustrating a configuration of the edge processor 108 of the image processor 101 illustrated in FIG. 1. As illustrated in FIG. 2, the edge processor 108 includes the LUT converter 201, the edge detector 202, and an edge correction unit 203. The edge processor 108 receives the first image data subjected to γ correction at the gamma converter 106, the attribute information, and the gradation-processed image data subjected to the gradation processing at the first gradation processor 107, and outputs the edge-processed image data.

Preferably, the LUT converter 201 applies LUT conversion processing to the first image data in order to perform processing in accordance with the attribute information of each object. The look-up table (LUT) is an input/output look-up table (also referred to as LUT conversion table) to be used for luminance conversion, which is previously prepared to indicate association between output luminance and input luminance. Luminance conversion is performed by referring to the LUT.

Next, the edge detector 202 performs edge detection processing on the image data subjected to LUT conversion, to output "1" (edge detection result) indicating that the image data is determined as an edge. The edge correction unit 203 receives the edge detection result from the edge detector 202, the gradation-processed image data, the image data subjected to LUT conversion, and the attribute information, and applies edge correction processing to the image data.

Figure 3:
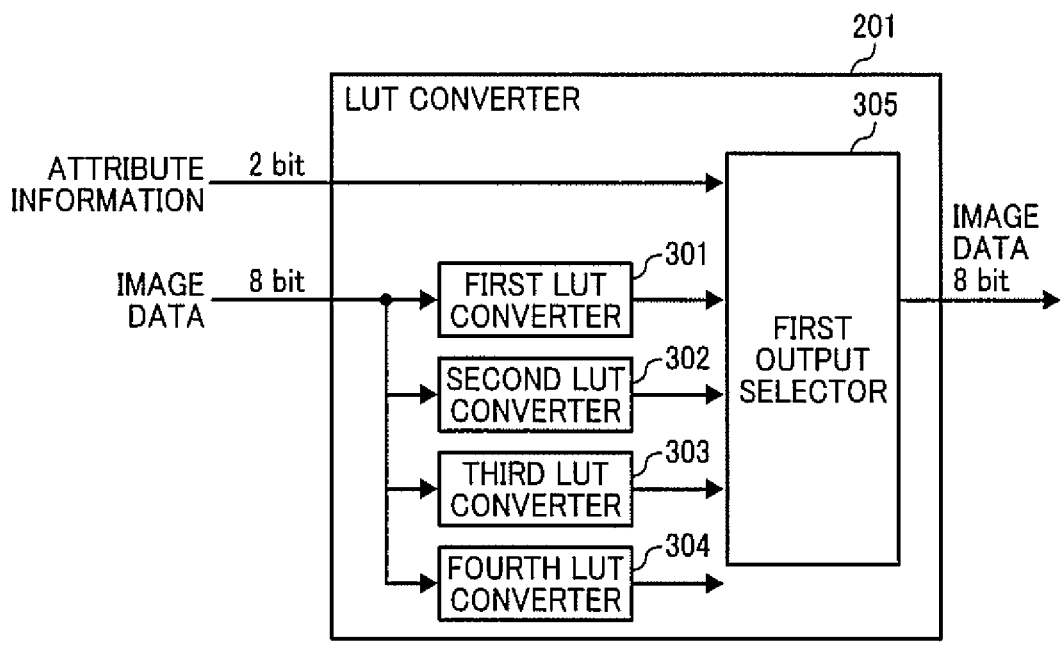
FIG. 3 is a block diagram illustrating a configuration of a look-up table (LUT) converter of the edge processor according to the embodiment of the present invention.

FIG. 3 is a block diagram illustrating a configuration of the LUT converter 201 of the edge processor 108 illustrated in FIG. 2. As illustrated in FIG. 3, the LUT converter 201 includes first to fourth LUT converters 301 to 304 and a first output selector 305. The LUT converter 201 receives the attribute information and the first image data, and outputs image data (also referred to as second image data).

Preferably, the LUT converter 201 at least holds the LUT conversion tables as many number as the gradation processing parameters (screens) supported by the image processor 101. For example, in the case of supporting six kinds of screens, the LUT converter 201 holds six kinds of LUT conversion tables.

Further, the image data is converted at the first to fourth LUT converters 301 to 304 (LUT conversion processing) in accordance with each of print modes by using an LUT conversion table corresponding to a screen used for each attribute. The print modes may be, for example, a screen A for images, a screen B for graphics/characters, and a screen A for others.

The LUT converter 201 converts the image data using the LUT conversion table in order to perform optimal edge processing on the first gradation processing applied to each attribute object. Then, the first output selector 305 outputs the second image data obtained as a result of the LUT conversion in accordance with the attribute information. Thus, optimal edge correction according to the screens can be performed by using different gradation processing parameters (screens) in accordance with the attribute information.

Figure 4:
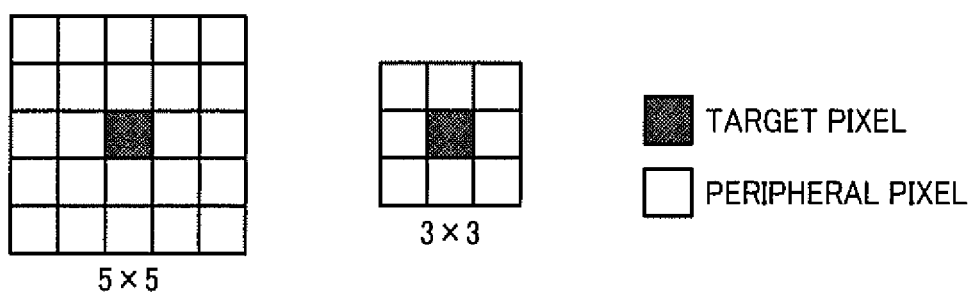
FIG. 4 is a diagram illustrating a target pixel and peripheral pixels in edge detection processing according to an embodiment of the present invention.

Referring back to FIG. 2, the edge detector 202 determines an edge candidate from among the image data of a target pixel and that of peripheral pixels of the target pixel (edge detection processing). FIG. 4 is a diagram illustrating the target pixel and the peripheral pixels in the edge detection processing. As illustrated in FIG. 4, for the peripheral pixels, a range of 5×5 in 1200 dpi, 3×3 in 600 dpi, etc. may be used, for example.

In the edge detection processing, for example, in the case where the target pixel is eth or more (0<eth≤255) and the peripheral pixel is other than zero (white background), a pixel of the peripheral pixels of a small value having a difference of dth or more (0<dth≤255) from the target pixel is counted, and a summation k of this count is acquired. Further, in the case where the peripheral pixel is zero (white background), counting is unconditionally performed when the target pixel is eth or more (0<eth≤255), and the summation k is acquired. Then, the edge detection result ("1" or "0") is output based on the summation k. For example, in the case where the summation k is nthl or more and nthul or less (0<nthl≤nthul), "1" is output as an edge candidate, and in other cases, "0" is output.

Figure 5:
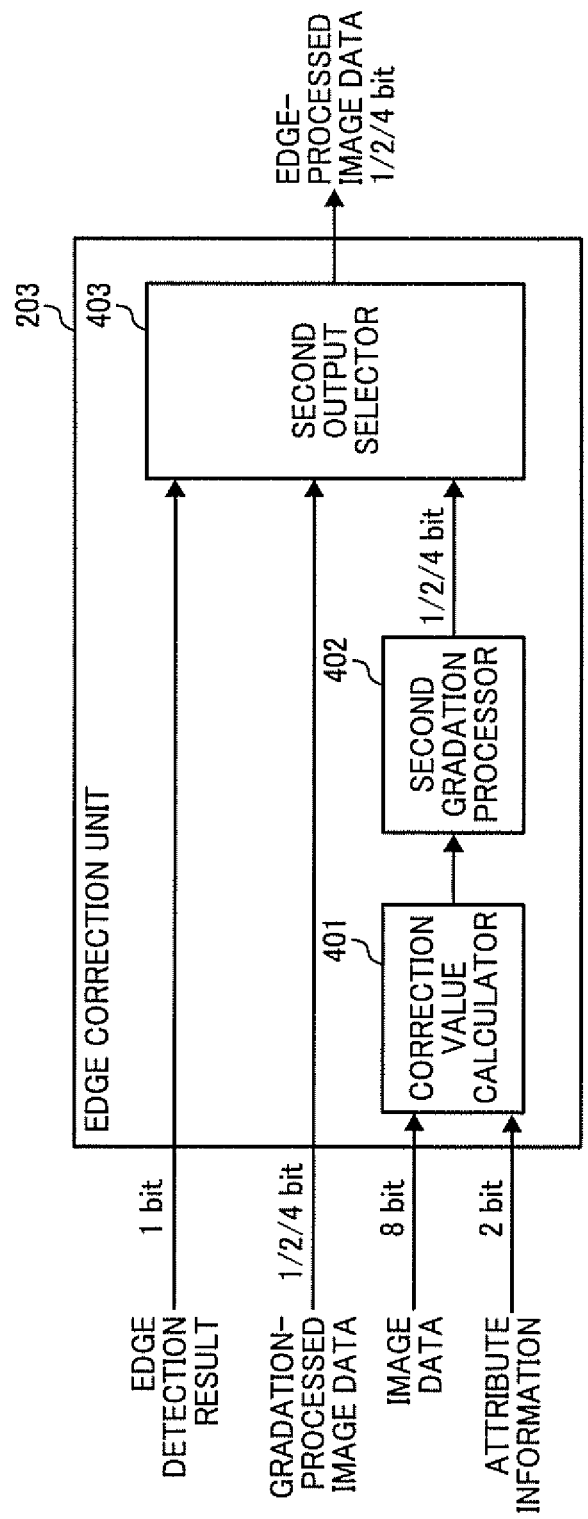
FIG. 5 is a block diagram illustrating a configuration of an edge correction unit of the edge processor according to the embodiment of the present invention.

FIG. 5 is a block diagram illustrating a configuration of the edge correction unit 203 of the edge processor 108 illustrated in FIG. 2. As illustrated in FIG. 5, the edge correction unit 203 includes the correction value calculator 401, the second gradation processor 402, and a second output selector 403. The edge correction unit 203 receives the edge detection result from the edge detector 202, the gradation-processed image data from the first gradation processor 107, the second image data from the LUT converter 201, and the attribute information, and outputs the edge-processed image data.

The correction value calculator 401 calculates a correction amount (edge correction amount) for the second image data subjected to the LUT conversion processing at the LUT converter 201, and outputs third image data subjected to the correction based on the correction amount (correction value calculation processing).

In the correction value calculator 401, the correction amount can be determined from the image data. For example, the correction amount can be varied between a solid portion and a non-solid portion of the image. Further, the correction amount can also be determined in accordance with the attribute information of the image. For example, in the case where the attribute information is an image, the correction value can be reduced, and in the case where the attribute information is characters or graphic data, the correction amount can be increased.

For example, in the case where the second image data received in the correction value calculator 401 is defined as simg, and the third image data to be output is defined as timg, a conversion curve to timg is determined by parameters beta_* (0≤beta_*≤255), and blim (0≤blim≤255). Further, the correction amount may be varied by a value of simg. For example, in the case of simg=255, the correction amount can be acquired by a following expression (1):

$$timg = \mathrm{MIN}[blim, (simg \times beta\_a)/255] \quad (1)$$

Further, in the case of 0≤simg<255, the correction amount can be acquired by a following expression (2):

$$timg = \mathrm{MIN}[blim, (simg \times beta\_b)/255] \quad (2)$$

Note that MIN [A, B] means a minimum value of A and B. Further, the value of beta_* may be also varied by the attribute information.

The third image data corrected at the correction value calculator 401 is received in the second gradation processor 402, and second gradation processing is performed. The second gradation processing is the gradation processing for edge processing which improves jaggies (second pseudo halftone processing), which is different from the first gradation processing.

More specifically, the second gradation processing differs than the first gradation processing in parameter, so that the second gradation processing is suitable to process the edge. For example, while the parameter for the first gradation processing may be various in terms of number of lines (such as a screen ruling) from low to high to process various portions, the parameter for the second gradation processing has a number of lines designed for the edge processing. For example, the second gradation processing preferably has a number of lines higher than that of the first gradation processing, to smoothen the edge.

The second output selector 403 outputs a result of the first gradation processing to a pixel determined as a non-edge, and outputs a result of the second gradation processing to the pixel determined as an edge by using the edge detection result from the edge detector 202. This is the edge-processed image data to be transferred to the image forming unit 109.

Figure 6:
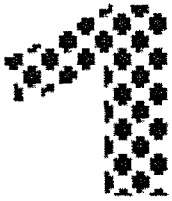
FIG. 6 is a schematic diagram illustrating a comparison result between a case of not applying edge correction, a case of applying edge correction in an image processor of the related art, and a case of applying edge correction in the image processor according to the embodiment of the present invention.

FIG. 6 is a schematic diagram illustrating a comparison result between a case of not applying edge correction, a case of applying edge correction in the image processor of the related art (method disclosed in JP-2006-295877-A), and a case of applying edge correction at the image processor according to the present embodiment (present technology).

In the case of not applying edge correction, a result of the first gradation processing is passed and output to the image-forming unit 109. After printing, jaggies are generated because a contour of a character is dotted.

Next, in the case of applying edge correction of the related art, an image having higher density is output by comparing a result of the first gradation processing with a result of the second gradation processing. Therefore, density at the edge becomes uneven, lacking smoothness at the edge due to the influence of the dot gain that is peculiar to an electrophotography.

In contrast, in the case of applying edge correction at the image processor according to the present embodiment, the second gradation processing is performed for the pixel detected as the edge, thereby making density at the edge even and achieving to keep smoothness at the edge.

FIG. 7 is a flowchart illustrating image processing executed by the image processor 101 according to the present embodiment.

First, first image data subjected to color conversion is received from a DFE server or the like, and gamma conversion is executed in accordance with a characteristic of the image processor 101 (S1). The first image data subjected to gamma conversion is converted to second image data by the LUT conversion processing (S2), and then the edge detection processing is executed for the second image data (S4). Further, the first gradation processing is executed for the first image data subjected to gamma conversion (S3).

Further, the second image data is converted to third image data by the correction value calculation processing for edge processing (S5), and the second gradation processing is executed for the third image data (S6).

The processing from S7 to S10 surrounded by a dotted line corresponds to output selection processing executed by the second output selector 403. In the second output selector 403, whether to execute edge correction is determined (S7), and in the case where edge correction is executed (S7: Yes), whether a target pixel is an edge is further determined (S8), and a result of the second gradation processing is output to the pixel detected as the edge (S8: Yes) (S9). On the other hand, in the case where executing edge correction is not executed (S7: No) and in the case where the target pixel is a non-edge (S8: No), a result obtained by executing the first gradation processing for the first image data (S3) is output (S10).

In the above-described image processor according to the present embodiment, an edge is detected from the received image data to apply processing to improve jaggies by pseudo halftone processing. The pseudo halftone processing to improve the jaggies is applied to a detected edge portion, and normal pseudo halftone processing is used for a non-edge portion. By this, a component to select a higher-density pixel signal becomes unnecessary, and the configuration of the image processor can be simplified. Moreover, unevenness of the density at the edge portion is eliminated. As a result, the problem of lacking smoothness at the edge portion due to dot gain is eliminated. Therefore, the jaggies at the edge portion can be improved without receiving any influence of the dot gain.

Note that the above-described embodiment is a preferable embodiment of the present invention, but not limited thereto, and various kinds of modifications can be made within the scope without departing from the gist of the present invention.

For example, the present invention can be incorporated as a function of a printer driver, and also as a plug-in function of an application, or can be implemented as a single application functioning as an intermediary between the application and the printer driver. Such application or plug-in software can be distributed by using a storage medium (CD-ROM, DVD-ROM, memory card, etc.) as an intermediary, or via a network.

Further, for example, the present invention also can be achieved by supplying a system or an apparatus with a storage medium storing a program code of software to implement the above-described functions, and reading and executing the program code stored in the storage medium by a computer (CPU or micro processing unit (MPU)) of the system or the apparatus. In this case, the above-described functions are implemented by the program code itself read from the storage medium. As the storage medium to supply the program code, for example, a hard disk, an optical disk, a magnetic optical disk, a non-volatile memory card, a read-only memory (ROM), etc, can be used, for example. Further, there may be inclusive cases where not only the above-described functions are implemented by executing the program code read by the computer but also the above-described functions are implemented by executing, based on commands of the program code, a part or an entire part of actual processing by an operating system (OS) and the like running on the computer. Additionally, there also may be an inclusive case where the above-described functions are implemented by writing the program code read from the storage medium in a memory provided at a function enhancement board inserted into the computer or at a function enhancement unit connected to the computer, and then executing a part or the entire part of the actual processing by the CPU or the like provided at the function enhancement board or the function enhancement unit, based on commands of the program code. Further, the program to implement the functions of the present invention may be provided from a server by communication via a network.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An image processing device, comprising:
a first gradation processor to apply first pseudo halftone processing to image data;
an edge detector to detect an edge portion of the image data to output a detection result;
a correction value calculator to calculate an edge correction amount and convert the image data to corrected image data based on the edge correction amount;
a second gradation processor to apply, to the corrected image data, second pseudo halftone processing for edge processing;
an output selector to adopt a processing result at the first gradation processor to a non-edge portion of the image data, and a processing result at the second gradation processor to an edge portion of the image data, based on the detection result at the edge detector; and
a converter to apply luminance conversion processing to the image data in accordance with attribute information of the image data, and output the processed image data to the edge detector and the correction value calculator.

2. The image processing device according to claim 1, wherein the converter stores a plurality of conversion tables corresponding to a number of gradation processing parameters applicable in the image processor.

3. The image processing device according to claim 1, wherein the correction value calculator calculates the edge correction amount based on the image data received at the correction value calculator.

4. The image processing device according to claim 1, wherein the correction value calculator calculates the edge correction amount based on attribute information of the image data received at the correction value calculator.

5. An image forming apparatus, comprising:
the image processing device of claim 1.

6. An image processing method, comprising:
executing first gradation processing to apply first pseudo halftone processing to image data;
detecting an edge portion of the image data to output a detection result;
converting the image data to corrected image data based on an edge correction amount;
executing second gradation processing to apply, to the corrected image data, second pseudo halftone processing for edge processing;
adopting a processing result of the first gradation processing to a non-edge portion of the image data and a processing result of the second gradation processing to an edge portion of the image data, based on the detection result; and
applying luminance conversion processing to the image data in accordance with attribute information of the image data to output the processed image data to an edge detector and a correction value calculator.

7. The image processing method of claim 6, further comprising:
storing a plurality of conversion tables corresponding to a number of gradation processing parameters applicable in an image processor.

8. The image processing method of claim 6, wherein the calculating includes:
calculating the edge correction amount based on the image data.

9. The image processing method of claim 6, wherein the calculating includes:
calculating the edge correction amount based on attribute information of the image data.

10. A non-transitory recording medium storing a plurality of instructions which, when executed by one or more processors, cause the processors to perform an image processing method comprising:
executing first gradation processing to apply first pseudo halftone processing to image data;
detecting an edge portion of the image data to output a detection result;
converting the image data to corrected image data based on an edge correction amount;
executing second gradation processing to apply, to the corrected image data, second pseudo halftone processing for edge processing;
adopting a processing result of the first gradation processing to a non-edge portion of the image data and a processing result of the second gradation processing to an edge portion of the image data, based on the detection result; and
applying luminance conversion processing to the image data in accordance with attribute information of the image data to output the processed image data to an edge detector and a correction value calculator.

* * * * *